United States Patent [19]

Bley

[11] Patent Number: 5,211,983
[45] Date of Patent: * May 18, 1993

[54] DE-VITALIZED SEED PRODUCT

[75] Inventor: Michael E. Bley, Minneapolis, Minn.

[73] Assignee: Golden Valley Microwave Foods, Inc., Edina, Minn.

[*] Notice: The portion of the term of this patent subsequent to Dec. 18, 2007 has been disclaimed.

[21] Appl. No.: 772,612

[22] Filed: Oct. 8, 1991

Related U.S. Application Data

[63] Continuation of Ser. No. 580,770, Sep. 11, 1990, abandoned, which is a continuation of Ser. No. 386,514, Jul. 27, 1989, Pat. No. 4,978,555.

[51] Int. Cl.⁵ ................................................ A23B 9/02
[52] U.S. Cl. .................................. 426/629; 426/627; 426/419; 426/618
[58] Field of Search ............... 426/627, 419, 618, 629, 426/321, 627, 418, 443, 465

[56] References Cited

U.S. PATENT DOCUMENTS

| | | |
|---|---|---|
| Re. 14,489 | 6/1918 | Franks . |
| 1,015,950 | 1/1912 | Gore . |
| 1,165,220 | 12/1915 | Barrow ............................ 426/618 |
| 1,798,781 | 3/1931 | Brooks . |
| 1,821,106 | 9/1931 | Milani . |
| 2,027,429 | 12/1931 | Hansen . |
| 2,046,158 | 6/1932 | Gore et al. . |
| 2,497,399 | 2/1950 | Dexter . |
| 2,518,100 | 8/1950 | Tomkins . |
| 2,631,379 | 3/1953 | Slotter et al. . |
| 2,953,429 | 9/1960 | Sniffler . |
| 2,955,940 | 10/1960 | Williams . |
| 3,102,780 | 9/1963 | Bedrosian et al. . |
| 3,875,684 | 4/1975 | Henneman ......................... 426/418 |
| 4,055,931 | 11/1977 | Myers . |
| 4,059,908 | 11/1977 | Smith ................................ 34/15 |
| 4,200,656 | 4/1980 | Cohen et al. . |
| 4,335,198 | 6/1982 | Vidal et al. ....................... 426/618 |
| 4,369,198 | 1/1983 | Uchi et al. . |
| 4,509,653 | 4/1985 | Corbett ............................. 426/124 |
| 4,627,336 | 12/1986 | Nam . |
| 4,978,555 | 12/1990 | Bley .................................. 426/618 |

OTHER PUBLICATIONS

Matz 1976 Snack Food Technology, AVI Publishing Co., Inc. Westport, Conn. pp. 116–128.
Studies on the peanut seed vigor stored in different gases, Lou et al. ACTA BOT SIN 25(5) 1983 (Biological Abstract).
Use of single, binary and tertiary gas mixtures of N, $CO_2$ and $O_2$ in seed storage, Yadov et al., Seed Research 1975 3(1) 34–38 (abstract).
Principles of Seed Science & Technology, Copeland p. 188, Burgess Publishing Company, 1976.
Carbon Dioxide Storage IX. Germination of lettuce seeds at high temperatures in both light & darkness, Thornton, Boyce Thompson Inst. vol. 8, 1936–37, pp. 38–40.
P. R. Hanson et al., Seed Sci. & Technol., 15, 155–162 (1987).
M. G. Jotwani et al., Atherigona varia soccata Rond. Pesticides, 5, 40–41 (1968).
P. F. Kononkov et al., Seed Sci. & Technol., 10, 95–103 (1982).
D. F. Powell, Ann. Appl. Biol., 81, 425–431 (1975).
D. F. Powell, Pl. Path., 24, 237–241 (1975).

(List continued on next page.)

[57] ABSTRACT

A devitalized popcorn seed product, exhibiting substantially the same popping performance as nondevitalized seed, which has a moisture content from about 12% to about 16%, and which is essentially free of non-inert treatment gases, and is essentially unaltered at the cellular level is provided.

1 Claim, 1 Drawing Sheet

OTHER PUBLICATIONS

W. Ralph, *Seed Sci. & Technol.*, 5, 567–573 (1977).
P. Sittisuang et al., *J. Pesticide Sci.*, 10, 461–468 (1985).
N. Ramakrishna et al., "Effect of surface sterilization, fumigation and gamma irradiation on the microflora and germination of barley seeds", *International Journal of Food Microbiology*, 13, 47–54 (1991).
K. Roy et al., "Biological effects of ethyl methanesulphonate and ethylene oxide on rice", *Genet. Agr.*, 29, 283–294 (1975).
P. M. Swamy, "Effect of methyl bromide fumigation on germination and metabolism of the seeds of groundnut (*Arachis hypogaea* L.)", *Indian J. Agric. Sci.*, 43(3), 274–279 (Mar. 1973).
S. R. Wadhi et al., "Effect of methyl bromide fumigation on the viability of sugarbeet seed fumigated and kept in different packing materials", *Indian J. Plant Prot.*, 5(1), 51–54 (1977).

*Primary Examiner*—Carolyn Paden
*Attorney, Agent, or Firm*—Merchant, Gould, Smith, Edell, Welter & Schmidt

DE-VITALIZED SEED PRODUCT

This is a continuation, of application Ser. No. 07/580,770, filed Sep. 11, 1990, now abandoned which in turn is a continuation of application Ser. No. 07/386,514, filed Jul 27, 1989, now U.S. Pat. No. 4,978,555.

FIELD OF THE INVENTION

This invention describes a method for devitalizing seeds, especially corn seed used for popcorn.

BACKGROUND OF THE INVENTION

Plant seeds include a germination step or phase as part of their growth cycle. In general, germination refers to the resumption of growth by an embryo in a seed after a period of dormancy. This resumption of growth occurs when a seed is exposed to suitable environmental conditions, including suitable temperature; adequate water and oxygen. Seeds, even in dormancy are respiring, but at a very slow rate. As the heat increases, the respiration rate will increase, regardless of the other conditions present. Absent proper temperature, moisture and oxygen, a seed will remain dormant.

Many food stuffs for human consumption are seeds. These include cereal grains, rice, wheat, corn, barley and oats. Plant seeds are also used in or as medicinal products, e.g., linseed oil, soybean oil and clothing, e.g., cottonseed. In some cases, seeds can not be used as intended if germination occurs.

Currently, dehydration is used to suppress undesired germination in seed products. Dehydration techniques can preclude germination, however, in some cases these techniques have an unacceptable effect on final product quality. For example, popcorn seed germination can be terminated by dehydration of the seed from about 14% to about 5%. However, even if rehydrated the popping capacity of such dehydrated corn seed is reduced to commercially unacceptable levels.

In the case of popcorn seed the need to terminate germination is especially important. Several countries, including Australia, do not allow importation of popcorn seed absent proof of complete seed devitalization. Accordingly, there is a need for an improved method to devitalize seed products, such as corn seed without adverse impact on product quality.

SUMMARY OF THE INVENTION

The present invention provides a method for devitalizing seeds by exposing the seed to an inert gas, in the presence of heat for a period of time effective to terminate seed respiration without substantially reducing product quality of the seed. In a preferred embodiment, a contained air atmosphere is flushed with $N_2$ or $CO_2$ and the seed is exposed to the inert gas for at least 24 hours.

In one preferred embodiment, corn seed to be used for popcorn is exposed to a temperature of at least 20° C., most preferably from about 20° to about 60° C. for about 2 days to about 45 days. After such treatment substantially all corn seed is devitalized without substantially reducing popping quality.

The present invention also provides for a devitalized popcorn seed product which exhibits substantially the same popping performance as undevitalized corn seed.

Other features and advantages of the invention will be apparent from the following detailed description and appended claims.

DETAILED DESCRIPTION OF THE INVENTION

Figure 1:
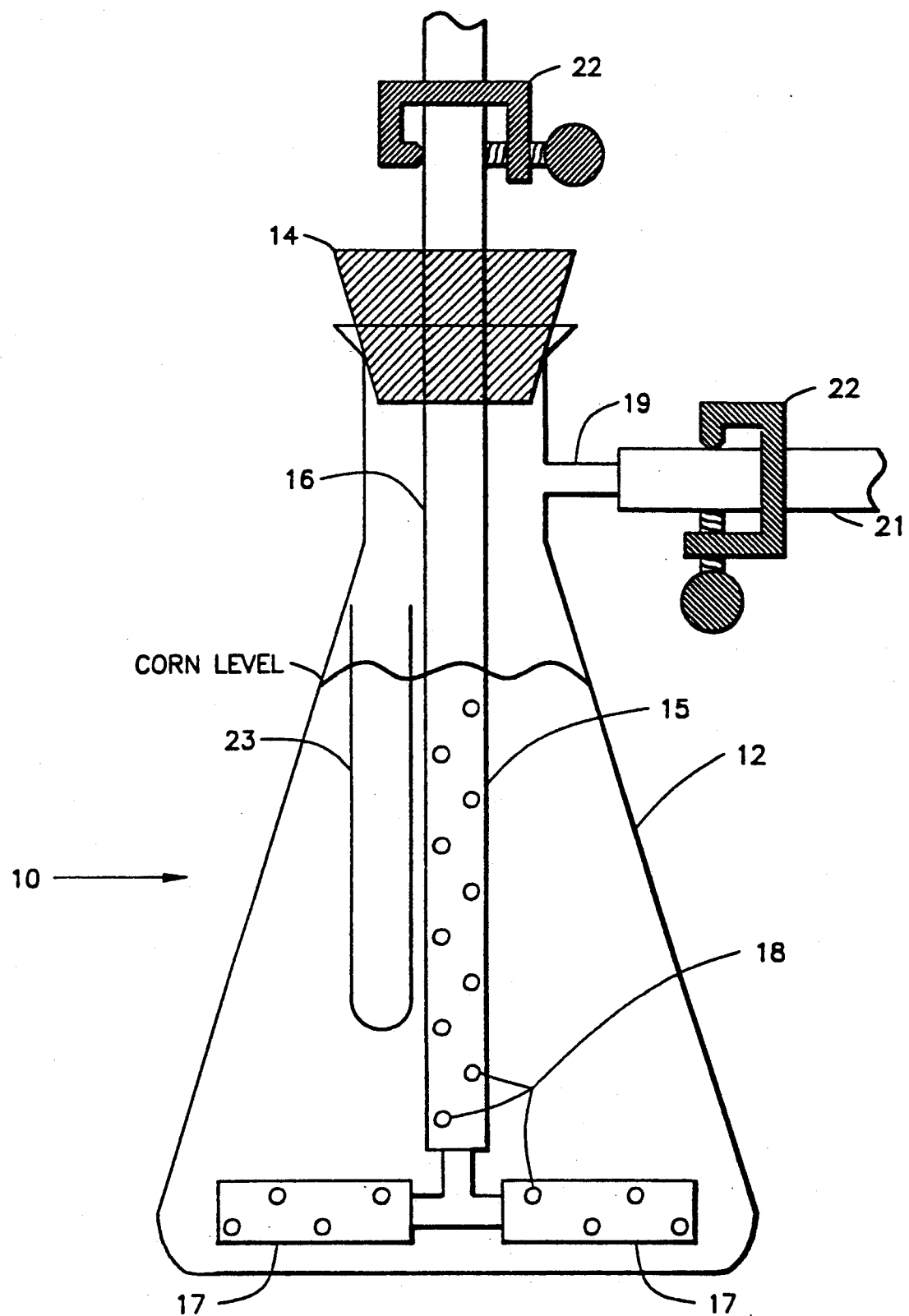
FIG. 1 shows an apparatus for devitalizing seed in accordance with the present invention.

The present invention provides a method for devitalizing seeds which involves exposing a plant seed to an inert gas and heat for a period of time effective to terminate seed respiration without substantially reducing product quality of the seed. As used herein the term "devitalize" refers to destroying the ability of a seed to germinate under otherwise acceptable germination conditions (i.e., adequate water, oxygen and temperature). The destruction of seed germination ability is evidenced by termination of seed respiration.

In the present invention, inert gas, preferably carbon dioxide ($CO_2$) or nitrogen ($N_2$) is substituted for air in a contained environment. The period of time needed to devitalize a seed with inert gas treatment will vary depending on the particular type of seed, amount of humidity, seed moisture content and heat. As used herein the term "heat" describes a temperature sufficient to accelerate the termination of seed respiration resulting from seed exposure to inert gas. While seed devitalization in the presence of inert gas can occur at or somewhat below ambient temperatures, preferably temperatures of at least 25° C. and preferably from about 20° C. to about 60° C. are used in the present invention. The period of exposure to inert gas at a temperature in this range can vary from about 2 days to about 45 days. It is believed that using the present invention that seed devitalization requires exposure to inert gas for at least 24 hours regardless of the amount of heat employed.

The present invention is specifically useful to devitalize corn seed used for popcorn. To treat popcorn seed a suitable container capable of maintaining a closed environment is employed. One such container is described in the Example below. However, it is to be understood that one of skill in the art will be able to construct any number of suitable containers to devitalize plant seed as described herein. Containers, flasks or apparatuses used in the present invention can be of varying size and shape and designed to include automated gas, temperature and humidity controls. One example of a suitable container is a grain storage bin. In certain commercial applications, it is envisioned that constant humidity control will be needed and can be provided by those having skill in the art.

After introduction of popcorn into the container, the atmosphere in the container is flushed or displaced by the introduction of $CO_2$, $N_2$ or other inert gas. Further, it is to be understood that various known methods can be used to introduce the inert gas into the container. The period of time needed to replace the air in the container will vary depending on container size and the flow rate of inert gas into the container. The corn seed is then incubated or stored in the inert gas environment for at least 24 hours and preferably for about 2 to about 45 days. Devitalization is facilitated by treating the corn seed at a temperature of at least 20° C.; preferably from about 20° C. to 60° C. and most preferably from about 40° C. to 60° C. The exact period of time needed to completely devitalize corn seed i.e., 100% loss of germination ability as measured by U.S.D.A. germination technique will vary somewhat, depending on the characteristics of a lot of popcorn seed. However, it is believed that essentially complete devitalization of popcorn seed can be accomplished without loss of popping performance after about at least 3 days and preferably after about 5-15 days of exposure at 40° C. to 60° C., or equivalent time and temperature combinations.

According to the present invention devitalized popcorn seed exhibits substantially no reduction in popping performance as a result of inert gas treatment. The popping performance of devitalized corn seed is at least 80% of the popping performance exhibited by the same corn seed which is not devitalized. In most cases popping performance of devitalized corn seed ranges from about 90% to near 100% (greater than 99%) of the popping performance exhibited by the same corn seed which is not devitalized.

Normal corn seed, used for popcorn exhibits a moisture content ranging from about 12% to 16%. The present invention provides a devitalized corn seed also having a moisture content of about 12% to 16% and which exhibits substantially the same popping performance as similar undevitalized corn seed.

Further, the devitalized corn seed is essentially free of non-inert treatment gas, including sterilization or fumigant treatment gases such as methyl bromide and ethylene oxide, and is essentially unaltered genetically at the cellular level. The devitalized seed exhibits no detectable amount of any non-inert treatment gas as measured by known techniques in the art. The devitalized corn seed also maintains the same genetic cellular structural characteristics present in the corn seed product prior to devitalization.

The present invention is especially useful for devitalizing popcorn seed to meet non-germination requirements for a popcorn product in certain countries. However, the devitalization techniques described herein can be applied by those of skill in the art to other seed products such as grains, millet, weed seeds such as *Crupina vulgaris* or the like.

EXAMPLE I

Apparatus

An appropriate apparatus for devitalizing corn seed is shown in FIG. 1. The apparatus 10 consists of a one liter flask or vessel 12 having a stopper 14 with an aperture for tubing 16 to deliver inert gas to the flask 12.

As seen in FIG. 1 the tubing 16 has a "Tee" shape with approximately 1¾" extension sections 17. The tubing 16 includes a number of holes 18 in each extension of the "Tee" and in the stem 15 to increase distribution of the gas as it enters the flask and to simulate the way gas may be introduced into a larger corn holding facility.

The tubing 16 is positioned in the flask 12 as seen in FIG. 1. A tube 23 filled with a lithium chloride (LiCl₂) mixture (7 gLiCL and 10 ml H₂O) is included in Flask 12 and serves as a constant humidity solution. The tubing 16 is positioned in flask 12 to extend approximately one inch above the top level of the corn in the flask. As seen in FIG. 1, the flask also includes a side vent 19 with rubber tubing 21 through which air present in the flask is evacuated when inert gas is introduced to the flask 12 through tubing 16. The side vent is provided with a clamp 22 as well as the top of the tubing (16) to seal the flask 12 after it is filled with inert gas so that inert gas cannot escape and external air cannot enter the flask 12.

Procedure

Four flasks (labeled A-$CO_2$, B-$CO_2$, C-$N_2$, D-$N_2$) of the type described above were filled to the one liter mark with corn seed from a single lot.

The moisture content of the seed in the flasks was measured in duplicate using the Model GAC II ™ Grain Analysis Computer (Dickey-john Corporation). The method used to determine moisture is the same as described in the computer's operation manual. The GAC ™-II is operated by loading predetermined constants ($K_1$-$K_9$) into the analyzer's computer memory. The grain handling system of the GAC ™-II then provides automatic, uniform loading of the grain. The GAC ™-II then makes the necessary computations for percentage moisture, sample test weight and sample temperature. The results are automatically recorded on a printer. Initially moisture determinations were 14.4% and 14.8%, respectively.

The amount of corn in each flask was as follows:

| A-$CO_2$ | 904.5 g | C-$N_2$ | 892.0 g |
|---|---|---|---|
| B-$CO_2$ | 891.6 g | D-$N_2$ | 873.2 g |

Tubes of LiCl₂ were added to all vessels. Each flask was flushed with $CO_2$ or $N_2$ for 3 minutes to replace all air present in the flask with the respective inert gas. Each flask was then placed in an incubator at 50°-51° C.

One hundred seeds of a "control" (no inert gas treatment) were planted in a seed chamber in accordance with U.S.D.A. germination technique. In accordance with the U.S.D.A. procedure 100 seeds are placed between two rolled, moistened paper towels. The samples are then placed in a temperature and humidity controlled environmental chamber. The chamber is controlled to 70° F. for 12 hours and 60° F. for 12 hours. The samples are checked daily for germination. The samples generally remain in the chamber for 14 days. In the present example, after 9 days the control sample exhibited 74% germination.

At day 2 all flasks were opened and additional $L_iCl_2$ was added to all tubes. 100 seeds were removed from flask D-$N_2$ and B-$CO_2$ and planted in accordance with U.S.D.A. procedure. All flasks were then reflushed with the appropriate inert gas for 3 minutes and returned to the 50°-51° C. incubator within 30 minutes from being removed therefrom. Moisture was determined using the Dickey-john Corporation Model GAC II Grain Analysis Computer for the $N_2$ flasks and determined to be 14.8% at this time; moisture was determined using the Dickey-john Corporation Model GAC II Grain Analysis Computer for the $CO_2$ flasks and was determined to be 15.0% and 14.7%, respectively at this time; and moisture was determined using the Dickey-john Corporation Model GAC II Grain Analysis Computer for the control flasks and determined to be 14.7% and 14.8%, respectively. After 7 days of grow out the day 2 sample from flask D-$N_2$ showed 96% germination and flask B-$CO_2$ showed 94% germination. At day 4 all flasks were again opened and 100 seed samples were removed from each flask and the seeds were planted in accordance with U.S.D.A. procedure. Moisture was determined using the Dickey-john Corporation Model GAC II Grain Analysis Computer for flask A-$CO_2$ and was determined to be 14.3% and 14.6%, respectively;

14.5% and 14.2% for flask C-N$_2$ and 14.9% and 14.7% for the control. These flasks exhibited 66% germination for CO$_2$ treatment and 78% germination for N$_2$ treatment on the 9th day of grow out.

On day 7 all flasks were again opened and 100 seed samples removed from flasks A-CO$_2$ and C-N$_2$ were planted in accordance with U.S.D.A. procedure and exhibited 3% and 4% germination respectively after a 15 day grow out period. Flasks A-CO$_2$ and C-N$_2$ were tested for moisture level by Dickey-John method, supra. Moisture content of duplicate samples of flask A-CO$_2$ was 14.3%. Duplicate samples of flask C-N$_2$ were 14.2% and 14.3%. All flasks were reflushed with appropriate gas and returned to the 50°-51° incubator.

On day 10, 100 seed samples removed from flasks A-CO$_2$ and C-N$_2$ on day 9 were planted in accordance with U.S.D.A. procedure. After 14 days, 0% growth was observed for samples from both flask A-CO$_2$ and C-N$_2$.

Table 1 summarizes the data from the germination study.

TABLE 1

| Flush Agents | CO$_2$ and N$_2$ | |
|---|---|---|
| Temperature | 50° C. | |
| Humidity | Approximately 20% | |
| | % Germination Control 74% | |
| Day | CO$_2$ | N$_2$ |
| 0 | — | — |
| 2 | 94% | 96% |
| 4 | 66% | 78% |
| 7 | 3% | 4% |
| 10 | 0% | 0% |

Popping Performance

On day 0, 5 popping bags of control seed were tested by placing 72 g of corn seed and 30 g oil in a bag and popping the corn for 3 minutes, 10 seconds in a Hotpoint microwave oven (550 mH$_z$). The following results were obtained:

| Sample | Weight | Volume | G. Unpop | % Pop |
|---|---|---|---|---|
| 1 | 119.45 | 2,300 | 12.81 | 82.20% |
| 2 | 119.65 | 2,350 | 12.44 | 82.72% |
| 3 | 119.52 | 2,250 | 11.9 | 83.47% |
| 4 | 119.34 | 2,200 | 12.30 | 82.91% |
| 5 | 119.30 | 2,250 | 12.80 | 82.22% |

On day 4, 5 popping bags of control seed were tested by placing 72 g of corn seed and 30 g oil in a bag and popping the corn for 3 minutes, 10 seconds in a Hotpoint microwave oven (550 mH$_2$). The following results were obtained:

| Sample | Weight | Volume | G. Unpop | % Pop |
|---|---|---|---|---|
| 1 | 119.44 | 2,300 | 11.0 | 84.7% |
| 2 | 119.44 | 2,200 | 13.4 | 81.4% |
| 3 | 119.99 | 2,400 | 12.28 | 82.9% |
| 4 | 119.52 | 2,350 | 11.16 | 84.5% |
| 5 | 119.43 | 2,300 | 10.77 | 85.0% |

On day 4, 5 bags of the N$_2$ treated corn were tested the same way as described above and produced the following results:

| Sample | Weight | Volume | G. Unpop | % Pop |
|---|---|---|---|---|
| 1 | 119.6 | 2,300 | 9.33 | 87.0% |
| 2 | 119.38 | 2,200 | 13.98 | 80.6% |
| 3 | 120.08 | 2,200 | 12.98 | 82.0% |
| 4 | 119.84 | 2,300 | 10.25 | 85.8% |
| 5 | 119.65 | 2,300 | 12.45 | 82.7% |

On day 4, 5 bags of CO$_2$ treated corn were tested the same way as described above and produced the following results:

| Sample | Weight | Volume | G. Unpop | % Pop |
|---|---|---|---|---|
| 1 | 119.54 | 2,300 | 13.38 | 81.4% |
| 2 | 119.45 | 2,200 | 12.67 | 82.4% |
| 3 | 119.30 | 2,200 | 16.24 | 77.4% |
| 4 | 120.10 | 2,350 | 11.81 | 83.6% |
| 5 | 119.47 | 2,300 | 14.25 | 80.2% |

On day 9 seed removed from flasks A-CO$_2$ and C-N$_2$ were tested for popping performance as described above and produced the following results:

| Sample | Weight | Volume | G. Unpop | % Pop |
|---|---|---|---|---|
| | | Run A-CO$_2$ | | |
| 1 | 119.5 | 2,200 | 9.03 | 87.5% |
| 2 | 119.8 | 2,300 | 6.57 | 90.9% |
| 3 | 119.8 | 2,200 | 8.66 | 88.0% |
| 4 | 119.6 | 2,300 | 6.30 | 91.2% |
| 5 | 120.2 | 2,300 | 6.89 | 90.4% |
| | | Run C-N$_2$ | | |
| 1 | 119.3 | 2,300 | 8.50 | 88.2% |
| 2 | 119.4 | 2,300 | 6.84 | 90.5% |
| 3 | 119.9 | 2,200 | 9.90 | 86.3% |
| 4 | 119.4 | 2,200 | 9.41 | 86.9% |
| 5 | 119.6 | 2,300 | 8.32 | 88.4% |

What is claimed is:
1. A food product comprising:
   a devitalized popcorn seed, said corn seed exhibiting popping performance substantially the same as exhibited by said corn seed prior to devitalization, said corn seed having a moisture content from about 12% to about 16%, being essentially free of non-inert sterilization or fumigant treatment gas, and being essentially unaltered genetically at the cellular level.

* * * * *